US011862370B2

(12) United States Patent
Yu et al.

(10) Patent No.: US 11,862,370 B2
(45) Date of Patent: Jan. 2, 2024

(54) HIGH-RESISTIVITY SINTERED SAMARIUM-COBALT MAGNET AND PREPARATION METHOD THEREOF

(71) Applicant: China Jiliang University, Zhejiang (CN)

(72) Inventors: Nengjun Yu, Zhejiang (CN); Jianghui Sun, Zhejiang (CN); Hangfu Yang, Zhejiang (CN); Minxiang Pan, Zhejiang (CN); Qiong Wu, Zhejiang (CN); Hongliang Ge, Zhejiang (CN)

(73) Assignee: China Jiliang University, Hangzhou (CN)

( * ) Notice: Subject to any disclaimer, the term of this patent is extended or adjusted under 35 U.S.C. 154(b) by 0 days.

(21) Appl. No.: 17/723,646

(22) Filed: Apr. 19, 2022

(65) Prior Publication Data

US 2022/0375662 A1 Nov. 24, 2022

(30) Foreign Application Priority Data

Apr. 20, 2021 (CN) ......................... 202110424362.3

(51) Int. Cl.

| | |
|---|---|
| ***H01F 1/059*** | (2006.01) |
| ***H01F 7/02*** | (2006.01) |
| ***H01F 41/02*** | (2006.01) |
| ***B22F 9/04*** | (2006.01) |

(52) U.S. Cl.

CPC ............... *H01F 1/059* (2013.01); *H01F 7/02* (2013.01); *H01F 41/0266* (2013.01)

(58) Field of Classification Search

None

See application file for complete search history.

(56) References Cited

U.S. PATENT DOCUMENTS

2011/0057756 A1* 3/2011 Marinescu .......... C22C 33/0207 419/10
2011/0200839 A1* 8/2011 Marinescu .............. B32B 15/04 428/611
2013/0038160 A1* 2/2013 Liu ....................... H01F 10/126 310/156.01

* cited by examiner

*Primary Examiner* — Xiaowei Su

(57) ABSTRACT

The present invention discloses a high-resistivity sintered samarium-cobalt magnet and a preparation method thereof. According to the present invention, considering the specialty of sintered samarium-cobalt magnetic powder, fluoride or oxide is firstly prepared into nano-powder using high-energy ball milling, and the samarium-cobalt magnetic powder is prepared separately by rolling ball milling or high-speed jet milling, and then a certain electric field is applied in a fluoride suspension to drive the fluoride nano-powder to evenly cover a surface of the samarium-cobalt magnetic powder. The present invention breaks through the technical bottleneck that fluoride/oxide can improve the resistivity of a samarium-cobalt magnet but result in deterioration of the magnetic properties.

9 Claims, No Drawings

HIGH-RESISTIVITY SINTERED SAMARIUM-COBALT MAGNET AND PREPARATION METHOD THEREOF

CROSS REFERENCE TO RELATED APPLICATION

The present application claims the benefit of Chinese Patent Application No. 202110424362.3 filed on Apr. 20, 2021. The contents of the above applications are incorporated herein by reference in their entirety.

TECHNICAL FIELD

The present invention belongs to the field of permanent magnet material preparation, and particularly relates to a high-resistivity sintered samarium-cobalt magnet and a preparation method thereof.

BACKGROUND $Sm_2Co_{17}$ sintered permanent magnets are widely applied in rail transit, gyroscopes and other industrial and military fields due to their good magnetic properties, high service temperature and strong corrosion resistance, considered as national strategic new materials. However, the $Sm_2Co_{17}$ sintered permanent magnets are alloy magnets without the non-metallic element boron and the non-metallic insulating elements carbon and silicon, and having good innate conductivity.

At present, the special magnetization mechanism and magnetization reversal mechanism of sintered $Sm_2Co_{17}$ samarium-cobalt magnets determine the special cellular structure and lamellar structure of the alloy existing in crystal grains. The crystal grains need to be controlled at 20 μm in size, and undersize crystal grains will deteriorate the squareness of a magnet demagnetizing curve. However, such large crystal grain size and excellent conductivity tend to produce electromagnetic eddy currents in the magnets to cause a temperature rise of the magnets, further deteriorating the magnetic properties of the magnets, and resulting in the in-service stability and safety problems of the magnets.

In the prior art, fluoride is used for improving the resistivity of neodymium iron boron (NdFeB) magnets, a rare earth-rich phase with a low melting point is present in the NdFeB magnets and will melt to form molten liquid through heat treatment, which is conducive to the uniform distribution of fluoride. But $Sm_2Co_{17}$ sintered permanent magnets and NdFeB magnets are essentially different in terms of magnetic sources and structural characteristics. Studies have shown that the melting point of $Sm_2Co_{17}$ sintered permanent magnets exceeds 1,100° C., and the melting point is relatively high. The heat treatment process is a solid-phase reaction process; the fluoride cannot enter the magnet even if a magnet surface is coated with fluoride particles; besides, the uniform distribution of the fluoride is so difficult in the heat treatment process that the resistivity of the magnet cannot be improved, and ion exchange may occur on the magnet surface. It has been proven by reference documents that this produces no effect on the resistivity, but magnet performance will be deteriorated due to unreasonable heat treatment processes.

Therefore, how to prepare samarium-cobalt magnets with high resistivity and high magnetic properties is an urgent problem to be solved.

SUMMARY

For the above-mentioned situations, in order to overcome the deficiencies existing in the prior art, the present invention provides a high-resistivity sintered samarium-cobalt magnet and a preparation method thereof.

In order to realize the above objective, the present invention provides the following technical solutions:

A method for preparing a high-resistivity sintered samarium-cobalt magnet includes the following steps:

(1) fluoride is weighed, the fluoride is mixed with alcohol and a surfactant, and then high-energy ball milling is performed to obtain fine fluoride powder, with an average particle size of 10-200 nm; the particle size of fluoride is controlled at 10-200 nm in order to minimize its effect on increasing resistivity of a magnet, or reduce the addition of fluoride under the same increase of resistivity to avoid decline in the magnetic properties of the magnet. If the particle size of fluoride is too small, inevitable agglomeration will occur to the fluoride, and the effect is equivalent to an adverse effect on the magnet when the particle size is large. In the present invention, 10-200 nm is screened as a range of the particle size for improving the resistivity and optimizing the magnetic properties at the same time.

(2) The fine fluoride powder prepared in step (1) is rinsed and dried in an oxygen-free glove box to obtain fluoride powder.

(3) Metal raw materials are weighed according to compositions of $Sm_2(CoFeCuZr)_{17}$ alloy, and then smelted uniformly to obtain alloy ingots.

(4) The alloy ingots are crushed, then magnetic powder is obtained by powder processing, with an average particle size of 2.5-5.2 μm; the magnetic powder is controlled at this particle size to form a good match with the particle size of the fluoride; if the particle size is too small, the proportion of the fluoride will be too high, and the magnetic properties of the magnet are deteriorated; and if the particle size is too large, a fluoride content in the magnet is too low to improve the resistivity.

(5) The fluoride powder prepared in step (2) is mixed with alcohol, and a suspension is prepared by ultrasonic treatment; mixing the fluoride with the alcohol is mainly for the purpose of obtaining a uniformly dispersed fluoride suspension, and the acetone and toluene liquids may also be used, but both of the liquids are of a certain toxicity. Water is not allowed for dispersion, otherwise it will accelerate oxidation of the magnetic powder, which is not conducive to the magnetic properties.

(6) The magnetic powder prepared in step (4) is spread evenly on a platinum sheet A at a bottom of a container, and the suspension prepared in step (5) is poured into the container; after pouring, a platinum sheet B is placed on a surface of the liquid in a suspended manner, the platinum sheet B is completely immersed in the suspension, then deposition treatment is performed under an electric field, and a voltage is applied to the platinum sheets A and B, with the platinum sheet B serving as a positive electrode and the platinum sheet A serving as a negative electrode, to obtain deposited magnetic powder.

(7) Magnetic field orientation molding and cold isostatic pressing are performed on the deposited powder prepared in step (6) to obtain compacts.

(8) The compacts prepared in step (7) are sintered, solutionized and annealed to obtain a high-resistivity sintered samarium-cobalt magnet.

Further, the fluoride in step (1) is one or more of calcium fluoride, magnesium fluoride, terbium fluoride, samarium fluoride, copper fluoride, zirconium fluoride, cobalt fluoride and iron fluoride, and the fluoride is 1-3% (by weight) of the magnetic powder in step (4).

Further, the surfactant in step (1) is one or more of oleic acid, n-heptane, ethylene glycol, cyclohexane, acetic acid and aminocyclic acid. In the present invention, the oleic acid and the like are added mainly as a surfactant to accelerate crushing of the fluoride, avoid the fluoride from agglomerating, so that the fluoride suspension with good dispersibility is easy to obtain.

In the prior art, alloy and the fluoride are mixed together for ball milling in some methods; and in the present invention, the high-energy ball milling is adopted for the fluoride, while rolling ball milling is adopted for the magnetic powder, and then subsequent operation is directly performed after the fluoride is uniformly distributed on the surface of the magnetic powder using an electrochemical method. The samarium-cobalt magnet prepared by the method of the present invention has high resistivity and good magnetic properties. If the alloy and the fluoride are mixed together for ball milling, some adverse effects will be caused; due to the different crushing behaviors of fluoride or oxide and alloy, oxide is usually more difficult to crush than magnetic metals (alloy); the oxide or fluoride is easier to agglomerate than the alloy, and tends to cover a surface of the alloy in the liquid environment. As a result, the efficiency of crushing the alloy is reduced, and the fluoride agglomerating together cannot play a role at the same time.

Further, in step (1), an addition amount of the surfactant is 2%-6% (by weight) of the fluoride.

Further, in step (1), a ball-to-material ratio of the high-energy ball milling process is 10-25 based on a percentage by weight.

Further, the $Sm_2(CoFeCuZr)_{17}$ alloy in step (3) includes the following compositions based on a percentage by weight: $24 \le Sm \le 31$, $5 \le Fe \le 30$, $4 \le Cu \le 9$, $2 \le Zr \le 4$, and the remaining amount of Co.

Further, the ultrasonic treatment time in step (5) is 0.5-4 h.

Further, the voltage in step (6) is 3-10 V, and the time is 10-60 min.

Further, in step (7), the magnetic field orientation forming process is performed at a magnetic field strength of 2 T and a pressure of 30-100 MPa.

Further, in step (7), the cold isostatic pressing process is performed at a pressure of 200-350 MPa.

Further, in the sintering process in step (8), the sintering is performed at a temperature of 1,190-1,240° C. for 0.5-4 h; and the solution treatment is performed at a temperature of 1,130-1,185° C. for 2-8 h.

Further, in step (8), the annealing process is as follows: keeping a temperature at 750-870° C. for 5-20 h, then slowly cooling down at 0.5-1.5° C./min to 400° C., and keeping the temperature for 5-20 h.

A high-resistivity sintered samarium-cobalt magnet includes the following compositions based on a percentage by weight: $23.5 \le Sm \le 30.2$, $4.8 \le Fe \le 29.7$, $3.9 \le Cu \le 8.9$, $2 \le Zr \le 3.8$, $0.02 \le F \le 0.08$, $0.04 \le TM \le 0.2$, and the remaining amount of Co, wherein TM is one or more of calcium, magnesium, terbium, copper, zirconium, cobalt and iron.

The present invention has the following beneficial effects:

(1) In the present invention, considering the specialty of sintered samarium-cobalt magnetic powder, fluoride or oxide is firstly prepared into nano-powder using the high-energy ball milling, and the samarium-cobalt magnetic powder is prepared separately by rolling ball milling or high-speed jet milling, and then a certain electric field is applied in the fluoride suspension to drive the fluoride nano-powder to evenly cover the surface of the samarium-cobalt magnetic powder. The present invention breaks through the technical bottleneck that fluoride/oxide can improve the resistivity of a samarium-cobalt magnet but result in deterioration of the magnetic properties.

(2) In the present invention, the fluoride powder is prepared by the chemically assisted high-energy ball milling process. Through adjustment of the surfactant and chemical additives, fluoride powder with controllable shape and particle size can be obtained. The fluoride can be prevented from agglomerating by preparing dispersing liquid of fluoride, and then the fluoride is enabled to evenly covers the magnet surface using an electrochemical method, solving the phenomenon of spontaneous agglomeration after the fluoride and the magnetic powder are mixed.

By using the electrochemical method, the magnetic powder is basically equipotential on the electrode, and the electric field is relatively uniform, and the driving force for the relatively uniform fluoride particles is basically the same, so that the fluoride distributes evenly in the prepared final magnet, thereby greatly reducing the influence of the fluoride on the properties of the magnet, and reducing the addition amount of fluoride under the same increase of resistivity.

DETAILED DESCRIPTION OF THE EMBODIMENTS

To make the objectives, technical solutions and advantages of this application more clearly, this application will be described and explained below in combination with the embodiments. It should be understood that the specific embodiments described are used for explaining this application only, rather than limiting this application. On the basis of the embodiments in this application, all the other embodiments obtained by those of ordinary skill in the art without making creative efforts will fall within the protection scope of this application.

The "embodiment" mentioned in this application means that the specific features, structures or characteristics described in combination with an embodiment may be involved in at least one of the embodiments of this application. The phrase appearing in different places of this specification is neither necessarily the same embodiment, nor an independent or alternative embodiment that is mutually exclusive from other embodiments. It is explicitly and implicitly understood by those of ordinary skill in the art that the embodiments described in this application can be combined with other embodiments in case of no conflict.

Unless defined otherwise, the technical terms or scientific terms involved in this application should have the general meanings understood by those of ordinary skill in the technical field to which this application belongs. The words "a", "an", "one", "the" and the like mentioned in this application may indicate the singular or the plural, rather than representing a quantitative limitation. The terms "including/comprising", "containing", "having" and any variant thereof mentioned in this application are intended to cover non-exclusive inclusion; the words "connection", "interconnection", "coupling" and the like are not limited to physical or mechanical connections, but can include electrical connections, whether direct or indirect. The phrase "a plurality of" involved in this application means more than or equal to 2. "And/or" describes an association between associated objects, indicating that three relationships are available. For example, "A and/or B" can mean that A exists alone, A and B exist at the same time, and B exists alone. The terms "first", "second", "third" and the like involved in this application are only to distinguish similar objects, and do not represent a specific order of the objects.

EXAMPLE 1

A method for preparing a high-resistivity sintered samarium-cobalt magnet included the following steps:

(1) Calcium fluoride was weighed according to 1% (by weight) of magnetic powder, oleic acid was weighed with an addition amount of 2% (by weight) of the calcium fluoride, the calcium fluoride and the oleic acid were mixed with alcohol, and then high-energy ball milling was performed at a ball-to-material ratio of 10:1 (that is, a mass ratio of steel balls to the calcium fluoride was 10:1) to obtain fine calcium fluoride powder with an average particle size of 10 nm. In the present invention, there is no limitation to the volume or mass of the alcohol, as long as a ball milling tank is fully filled.

(2) The fine calcium fluoride powder prepared in step (1) was rinsed and dried in an oxygen-free glove box (in the present invention, there is no limitation to the drying temperature; the drying was performed at a room temperature in this example) to obtain calcium fluoride powder.

(3) Metal raw materials were weighed according to compositions based on a percentage by weight: Sm=24%, Co=40%, Fe=30%, Cu=4% and Zr=2%, and then smelted uniformly by induction melting or arc melting to obtain alloy ingots. The induction smelting or arc smelting in this example is a conventional smelting method in the art, and the present invention does not improve the steps and principles of the induction smelting or arc smelting.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 3:1, with 120# high-purity gasoline or high-purity methylbenzene serving as a medium for the ball milling, to obtain magnetic powder with an average particle size of 2.5 μm. The coarse crushing was performed first using the jaw crusher, and then the fine crushing was performed using the disk crusher. There is no limitation to the particle size after fine crushing. The particle size of the magnetic powder after the fine crushing was 0-150 μm in this example.

(5) The calcium fluoride powder prepared in step (2) was mixed with alcohol, and a suspension was obtained by ultrasonic treatment for 0.5 h. In the present invention, there is no specific limitation to a mass ratio of the calcium fluoride powder to the alcohol, as long as the fluoride can be immersed by the alcohol.

(6) The magnetic powder prepared in step (4) was spread evenly on a platinum sheet A at a bottom of a container, and the suspension prepared in step (5) was slowly poured into the container to avoid the magnetic powder from suspending; after pouring, a platinum sheet B was placed on a surface of the liquid in a suspended manner, the platinum sheet B was completely immersed in the suspension, then deposition treatment was performed under an electric field, and a voltage of 3 V was applied to the platinum sheets A and B for 60 min, with the platinum sheet B serving as a positive electrode and the platinum sheet A serving as a negative electrode, to obtain deposited magnetic powder.

(7) Magnetic field orientation molding at a magnetic filed strength of 2 T and a pressure of 30 MPa and cold isostatic pressing at a pressure of 200 MPa were performed on the deposited magnetic powder prepared in step (6) to obtain compacts.

(8) The compacts prepared in step (7) were sintered at a temperature of 1,240° C. for 0.5 h. The solution treatment was performed at a temperature of 1,185° C. for 2 h, and the compacts were cooled down to a room temperature. Afterwards, annealing was performed by keeping a temperature of 870° C. for 5 h, then slowly cooling down at 0.5° C./min to 400° C. and keeping the temperature for 5 h. A final-state magnet obtained included the following compositions based on a percentage by weight: Sm=23.5%, Fe=29.7%, Cu=3.9%, Zr=2%, F=0.02%, Ca=0.04% and the remaining amount of Co (namely Co=40.84%).

COMPARATIVE EXAMPLE 1-1

A method for preparing a high-resistivity sintered samarium-cobalt magnet included the following steps:

(1) Calcium fluoride was weighed according to 1% (by weight) of magnetic powder, oleic acid was weighed with an addition amount of 2% (by weight) of the calcium fluoride, the calcium fluoride and the oleic acid were mixed with alcohol, and then high-energy ball milling was performed at a ball-to-material ratio of 10:1 (that is, a mass ratio of steel balls to the calcium fluoride was 10:1) to obtain fine calcium fluoride powder with an average particle size of 10 nm.

(2) Metal raw materials were weighed according to compositions based on a percentage by weight: Sm=24%, Co=40%, Fe=30%, Cu=4% and Zr=2%, and then smelted uniformly by induction melting or arc melting to obtain alloy ingots.

(3) Coarse crushing and fine crushing were performed on the alloy ingots prepared in step (2) using a jaw crusher and a disk crusher, respectively, then the fine calcium fluoride powder prepared in step (1) was added, and powder processing was performed on the finely crushed powder using a stirring mill or rolling ball mill at a ball-to-material mass ratio of 3:1, with 120# high-purity gasoline or high-purity methylbenzene serving as a medium for the ball milling, to obtain magnetic powder with an average particle size of 2.5 μm.

(4) Magnetic field orientation molding at a magnetic filed strength of 2 T and a pressure of 30 MPa and cold isostatic pressing at a pressure of 200 MPa were performed on the magnetic powder prepared in step (3) to obtain compacts.

(5) The compacts prepared in step (4) were sintered at a temperature of 1,240° C. for 0.5 h. The solution treatment was performed at a temperature of 1,185° C. for 2 h, and the compacts were cooled down to a room temperature. Afterwards, annealing was performed by keeping a temperature of 870° C. for 5 h, then slowly cooling down at 0.5° C./min to 400° C. and keeping the temperature for 5 h. A final-state magnet obtained included the following compositions based on a percentage by weight: Sm=23.5%, Fe=29.7%, Cu=3.9%, Zr=2%, F=0.02%, Ca=0.04% and the remaining amount of Co.

All the other conditions in this comparative example were the same as those in example 1.

COMPARATIVE EXAMPLE 1-2

(1) Calcium fluoride was weighed according to 1% (by weight) of magnetic powder, oleic acid was weighed with an addition amount of 2% (by weight) of the calcium fluoride, the calcium fluoride and the oleic acid were mixed with alcohol, and then high-energy ball milling was performed at a ball-to-material ratio of 10:1 to obtain fine calcium fluoride powder with an average particle size of 10 nm.

(2) The fine calcium fluoride powder prepared in step (1) was rinsed and dried in an oxygen-free glove box to obtain calcium fluoride powder.

(3) Metal raw materials were weighed according to compositions based on a percentage by weight: Sm=24%, Co=40%, Fe=30%, Cu=4% and Zr=2%, and then smelted uniformly by induction melting or arc melting to obtain alloy ingots.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 3:1, with 120# high-purity gasoline or high-purity methylbenzene serving as a medium for the ball milling, to obtain magnetic powder with an average particle size of 2.5 μm.

(5) The calcium fluoride powder prepared in step (2) was mixed with alcohol, and a suspension was obtained by ultrasonic treatment for 0.5 h.

(6) The magnetic powder prepared in step (4) was spread evenly at a bottom of a container, the suspension prepared in step (5) was slowly poured into the container to avoid the magnetic powder from suspending, and the immersion lasted for 60 min without applying any voltage to obtain immersed magnetic powder.

(7) Magnetic field orientation molding at a magnetic filed strength of 2 T and a pressure of 30 MPa and cold isostatic pressing at a pressure of 200 MPa were performed on the immersed magnetic powder prepared in step (6) to obtain compacts.

(8) The compacts prepared in step (7) were sintered at a temperature of 1,240° C. for 0.5 h. The solution treatment was performed at a temperature of 1,185° C. for 2 h, and the compacts were cooled down to a room temperature. Afterwards, annealing was performed by keeping a temperature of 870° C. for 5 h, then slowly cooling down at 0.5° C./min to 400° C. and keeping the temperature for 5 h. A final-state magnet obtained included the following compositions based on a percentage by weight: Sm=23.5%, Fe=29.7%, Cu=3.9%, Zr=2%, F=0.02%, Ca=0.04% and the remaining amount of Co (namely Co=40.84%).

All the other conditions in this comparative example were the same as those in example 1.

EXAMPLE 2

(1) Magnesium fluoride was weighed according to 2% (by weight) of magnetic powder, oleic acid was weighed with an addition amount of 4% (by weight) of the magnesium fluoride, the magnesium fluoride and the oleic acid were mixed with alcohol, and then high-energy ball milling was performed at a ball-to-material ratio of 18:1 (that is, a mass ratio of steel balls to the magnesium fluoride was 18:1) to obtain fine magnesium fluoride powder with an average particle size of 100 nm. The alcohol was used as a medium for filling a ball milling tank. In the present invention, there is no limitation to the volume or mass of the alcohol, as long as the ball milling tank is fully filled.

(2) The fine powder prepared in step (1) was placed in an oxygen-free glove box, and the fine magnesium fluoride powder was rinsed and dried to obtain magnesium fluoride powder.

(3) Metal raw materials were weighed according to compositions based on a percentage by weight: Sm=27%, Co=46%, Fe=18%, Cu=6% and Zr=3%, and then smelted uniformly by induction melting or arc melting to obtain alloy ingots.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 6:1, with 120# high-purity gasoline or high-purity methylbenzene serving as a medium for the ball milling, to obtain magnetic powder with an average particle size of 4 μm.

(5) The magnesium fluoride powder prepared in step (2) was mixed with alcohol, and a suspension was obtained by ultrasonic treatment for 2.5 h. In the present invention, there is no specific limitation to a mass ratio of the magnesium fluoride powder to the alcohol, as long as the fluoride can be immersed by the alcohol.

(6) The magnetic powder prepared in step (4) was spread evenly on a platinum sheet A at a bottom of a container, and the suspension prepared in step (5) was slowly poured into the container to avoid the magnetic powder from suspending; after pouring, a platinum sheet B was placed on a surface of the liquid in a suspended manner, the platinum sheet B was completely immersed in the suspension, then deposition treatment was performed under an electric field, and a voltage of 7 V was applied to the platinum sheets A and B for 35 min, with the platinum sheet B serving as a positive electrode and the platinum sheet A serving as a negative electrode, to obtain deposited magnetic powder.

(7) Magnetic field orientation molding at a magnetic filed strength of 2 T and a pressure of 60 MPa and cold isostatic pressing at a pressure of 270 MPa were performed on the deposited magnetic powder prepared in step (6) to obtain compacts.

(8) The compacts prepared in step (7) were sintered at a temperature of 1,210° C. for 2.5 h. The solution treatment was performed at a temperature of 1,160° C. for 5 h, and the compacts were cooled down to a room temperature. Afterwards, annealing was performed by keeping a temperature of 800° C. for 13 h, then slowly cooling down at 1° C./min to 400° C. and keeping the temperature for 13 h. A final-state magnet obtained included the following compositions based on a percentage by weight: Sm=26.8%, Fe=17.3%, Cu=5.9%, Zr=2.9%, F=0.05%, Mg=0.1%, and the remaining amount of Co (namely Co=46.95%).

COMPARATIVE EXAMPLE 2-1

(1) Magnesium fluoride was weighed according to 2% (by weight) of magnetic powder, oleic acid was weighed with an addition amount of 4% (by weight) of the magnesium fluoride, the magnesium fluoride and the oleic acid were mixed with alcohol, and then high-energy ball milling was performed at a ball-to-material ratio of 18:1 to obtain fine magnesium fluoride powder with an average particle size of 100 nm.

(2) Metal raw materials were weighed according to compositions based on a percentage by weight: Sm=27%, Co=46%, Fe=18%, Cu=6% and Zr=3%, and then smelted uniformly by induction melting or arc melting to obtain alloy ingots.

(3) Coarse crushing and fine crushing were performed on the alloy ingots prepared in step (2) using a jaw crusher and a disk crusher, respectively, then the fine magnesium fluoride powder prepared in step (1) was added, and powder processing was performed on the finely crushed powder using a stirring mill or rolling ball mill at a ball-to-material mass ratio of 6:1, with 120# high-purity gasoline or high-purity methylbenzene serving as a medium for the ball milling, to obtain magnetic powder with an average particle size of 4 μm.

(4) Magnetic field orientation molding at a magnetic filed strength of 2 T and a pressure of 60 MPa and cold isostatic pressing at a pressure of 270 MPa were performed on the magnetic powder prepared in step (3) to obtain compacts.

(5) The compacts prepared in step (4) were sintered at a temperature of 1,210° C. for 2.5 h. The solution treatment was performed at a temperature of 1,160° C. for 5 h, and the compacts were cooled down to a room temperature. Afterwards, annealing was performed by keeping a temperature of 800° C. for 13 h, then slowly cooling down at 1° C./min to 400° C. and keeping the temperature for 13 h. A final-state magnet obtained included the following compositions based on a percentage by weight: Sm=26.8%, Fe=17.3%, Cu=5.9%, Zr=2.9%, F=0.05%, Mg=0.1%, and the remaining amount of Co (namely Co=46.95%).

All the other conditions in this comparative example were the same as those in example 2.

COMPARATIVE EXAMPLE 2-2

(1) Magnesium fluoride was weighed according to 2% (by weight) of magnetic powder, oleic acid was weighed with an addition amount of 4% (by weight) of the magnesium fluoride, the magnesium fluoride and the oleic acid were mixed with alcohol, and then high-energy ball milling was performed at a ball-to-material ratio of 18:1 to obtain fine magnesium fluoride powder with an average particle size of 100 nm.

(2) The fine powder prepared in step (1) was placed in an oxygen-free glove box, and the fine magnesium fluoride powder was rinsed and dried to obtain magnesium fluoride powder.

(3) Metal raw materials were weighed according to compositions based on a percentage by weight: Sm=27%, Co=46%, Fe=18%, Cu=6% and Zr=3%, and then the raw materials were smelted uniformly by induction melting or arc melting to obtain alloy ingots.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 6:1, with 120# high-purity gasoline or high-purity methylbenzene serving as a medium for the ball milling, to obtain magnetic powder with an average particle size of 4 μm.

(5) The magnesium fluoride powder prepared in step (2) was mixed with alcohol, and a suspension was obtained by ultrasonic treatment for 2.5 h.

(6) The magnetic powder prepared in step (4) was spread evenly at a bottom of a container, and the suspension prepared in step (5) was slowly poured into the container to avoid the magnetic powder from suspending, and the immersion lasted for 35 min without applying any voltage to obtain immersed magnetic powder.

(7) Magnetic field orientation molding at a magnetic filed strength of 2 T and a pressure of 60 MPa and cold isostatic pressing at a pressure of 270 MPa were performed on the immersed magnetic powder prepared in step (6) to obtain compacts.

(8) The compacts prepared in step (7) were sintered at a temperature of 1,210° C. for 2.5 h. The solution treatment was performed at a temperature of 1,160° C. for 5 h, and the compacts were cooled down to a room temperature. Afterwards, annealing was performed by keeping a temperature of 800° C. for 13 h, then slowly cooling down at 1° C./min to 400° C. and keeping the temperature for 13 h. A final-state magnet obtained included the following compositions based on a percentage by weight: Sm=26.8%, Fe=17.3%, Cu=5.9%, Zr=2.9%, F=0.05%, Mg=0.1%, and the remaining amount of Co.

All the other conditions in this comparative example were the same as those in example 2.

EXAMPLE 3

(1) Terbium fluoride was weighed according to 3% (by weight) of magnetic powder, oleic acid was weighed with an addition amount of 6% (by weight) of the terbium fluoride, the terbium fluoride and the oleic acid were mixed with alcohol, and then high-energy ball milling was performed at a ball-to-material ratio of 25:1 (that is, a mass ratio of steel balls to the terbium fluoride was 25:1) to obtain fine terbium fluoride powder with an average particle size of 200 nm. The alcohol was used as a medium for filling a ball milling tank. In the present invention, there is no limitation to the volume or mass of the alcohol, as long as the ball milling tank is fully filled.

(2) The fine powder prepared in step (1) was placed in an oxygen-free glove box, and the fine terbium fluoride powder was rinsed and dried to obtain terbium fluoride powder.

(3) Metal raw materials were weighed according to compositions based on a percentage by weight: Sm:Co:Fe:Cu:Zr=31:51:5:9:4, and then the raw materials were smelted uniformly by induction melting or arc melting to obtain alloy ingots.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 8:1, with 120# high-purity gasoline or high-purity methylbenzene serving as a medium for the ball milling, to obtain magnetic powder with an average particle size of 5.2 μm.

(5) The terbium fluoride powder prepared in step (2) was mixed with alcohol, and a suspension was obtained by ultrasonic treatment for 4 h. In the present invention, there is no specific limitation to a mass ratio of the magnesium fluoride powder to the alcohol, as long as the fluoride can be immersed by the alcohol.

(6) The magnetic powder prepared in step (4) was spread evenly on a platinum sheet A at a bottom of a container, and the suspension prepared in step (5) was slowly poured into the container to avoid the magnetic powder from suspending; after pouring, a platinum sheet B was placed on a surface of the liquid in a suspended manner, the platinum sheet B was completely immersed in the suspension, then deposition treatment was performed under an electric field, and a voltage of 10 V was applied to the platinum sheets A and B for 10 min, with the platinum sheet B serving as a positive electrode and the platinum sheet A serving as a negative electrode, to obtain deposited magnetic powder.

(7) Magnetic field orientation molding at a magnetic filed strength of 2 T and a pressure of 100 MPa and cold isostatic pressing at a pressure of 350 MPa were performed on the deposited magnetic powder prepared in step (6) to obtain compacts.

(8) The compacts prepared in step (7) were sintered at a temperature of 1,190° C. for 4 h. The solution treatment was performed at a temperature of 1,130° C. for 8 h, and the compacts were cooled down to a room temperature. Afterwards, annealing was performed by keeping a temperature of 750° C. for 20 h, then slowly cooling down at 1.5° C./min to 400° C. and keeping the temperature for 20 h. A final-state magnet obtained was a high-resistivity sintered samarium-cobalt magnet, including the following compositions based on a percentage by weight: Sm=30.2%, Fe=4.8%, Cu=8.9%, Zr=3.8%, F=0.08%, TM=0.2%, and the remaining amount of Co, wherein TM was terbium.

COMPARATIVE EXAMPLE 3-1

(1) Terbium fluoride was weighed according to 3% (by weight) of magnetic powder, oleic acid was weighed with an addition amount of 6% (by weight) of the terbium fluoride, the terbium fluoride and the oleic acid were mixed with alcohol, and then high-energy ball milling was performed at a ball-to-material ratio of 25:1 to obtain fine terbium fluoride powder with an average particle size of 200 nm.

(2) Metal raw materials were weighed based on a percentage by weight according to a chemical formula of $Sm_{31}Co_{51}Fe_5Cu_9Zr_4$ and the remaining amount of Co, and then smelted uniformly by induction melting or arc melting to obtain alloy ingots.

(3) Coarse crushing and fine crushing were performed on the alloy ingots prepared in step (2) using a jaw crusher and a disk crusher, respectively, then the fine terbium fluoride powder prepared in step (1) was added, and powder processing was performed on the finely crushed powder using a stirring mill or rolling ball mill at a ball-to-material mass ratio of 8:1, with 120# high-purity gasoline or high-purity methylbenzene serving as a medium for the ball milling, to obtain magnetic powder with an average particle size of 5.2 μm.

(4) Magnetic field orientation molding at a magnetic filed strength of 2 T and a pressure of 100 MPa and cold isostatic pressing at a pressure of 350 MPa were performed on the magnetic powder prepared in step (3) to obtain compacts.

(5) The compacts prepared in step (4) were sintered at a temperature of 1,190° C. for 4 h. The solution treatment was performed at a temperature of 1,130° C. for 8 h, and the compacts were cooled down to a room temperature. Afterwards, annealing was performed by keeping a temperature of 750° C. for 20 h, then slowly cooling down at 1.5° C./min to 400° C. and keeping the temperature for 20 h. A final-state magnet obtained was a sintered samarium-cobalt magnet, including the following compositions based on a percentage by weight: Sm=30.2, Fe=4.8, Cu=8.9, Zr=3.8, F=0.08, TM=0.2, and the remaining amount of Co, wherein TM was terbium.

All the other conditions in this comparative example were the same as those in example 3.

COMPARATIVE EXAMPLE 3-2

(1) Terbium fluoride was weighed according to 3% (by weight) of magnetic powder, oleic acid was weighed with an addition amount of 6% (by weight) of the terbium fluoride, the terbium fluoride and the oleic acid were mixed with alcohol, and then high-energy ball milling was performed at a ball-to-material ratio of 25:1 to obtain fine terbium fluoride powder with an average particle size of 200 nm.

(2) The fine powder prepared in step (1) was placed in an oxygen-free glove box, and the fine terbium fluoride powder was rinsed and dried to obtain terbium fluoride powder.

(3) Metal raw materials were weighed based on a percentage by weight according to a chemical formula of $Sm_{31}Co_{51}Fe_5Cu_9Zr_4$ and the remaining amount of Co, and then smelted uniformly by induction melting or arc melting to obtain alloy ingots.

(4) Coarse crushing and fine crushing were performed on the alloy ingots prepared in step (3) using a jaw crusher and a disk crusher, respectively, and then powder processing was performed on the finely crushed powder using a stirring mill or rolling ball mill at a ball-to-material mass ratio of 8:1, with 120# high-purity gasoline or high-purity methylbenzene serving as a medium for the ball milling, to obtain magnetic powder with an average particle size of 5.2 μm.

(5) The terbium fluoride powder prepared in step (2) was mixed with alcohol, and a suspension was obtained by ultrasonic treatment for 4 h.

(6) The magnetic powder prepared in step (4) was spread evenly at a bottom of a container, and the suspension prepared in step (5) was slowly poured into the container to avoid the magnetic powder from suspending, and the immersion lasted for 10 min without applying any voltage to obtain immersed magnetic powder.

(7) Magnetic field orientation molding at a magnetic field strength of 2 T and a pressure of 100 MPa and cold isostatic pressing at a pressure of 350 MPa were performed on the immersed magnetic powder prepared in step (6) to obtain compacts.

(8) The compacts prepared in step (7) were sintered at a temperature of 1,190° C. for 4 h. The solution treatment was performed at a temperature of 1,130° C. for 8 h, and the compacts were cooled down to a room temperature. Afterwards, annealing was performed by keeping a temperature of 750° C. for 20 h, then slowly cooling down at 1.5° C./min to 400° C. and keeping the temperature for 20 h. A final-state magnet obtained was a sintered samarium-cobalt magnet, including the following compositions based on a percentage by weight: Sm=30.2, Fe=4.8, Cu=8.9, Zr=3.8, F=0.08, TM=0.2, and the remaining amount of Co, wherein TM was terbium.

All the other conditions in this comparative example were the same as those in example 3.

The magnets prepared in the above-mentioned examples and comparative examples were tested. The magnetic properties of the magnets were tested using a pulsed magnetometer at a maximum magnetic field of 11 T, and the magnetic properties were determined at a room temperature. The resistivity was detected using a four-point method. The detection results are as shown in Table 1.

TABLE 1

Magnetic Properties and Resistivity Data of the Magnets Prepared in the Examples and the Comparative Examples

| Item | Br (kG) | Hcj (kOe) | (BH)max (MGOe) | Resistivity (μΩ · mm) |
|---|---|---|---|---|
| Example 1 | 11.72 | 19.83 | 31.60 | 143.50 |
| Comparative Example 1-1 | 10.56 | 11.34 | 22.92 | 139.60 |
| Comparative Example 1-2 | 10.91 | 13.70 | 26.38 | 126.70 |
| Example 2 | 11.28 | 27.63 | 29.57 | 156.80 |
| Comparative Example 2-1 | 9.80 | 8.73 | 18.50 | 154.90 |
| Comparative Example 2-2 | 10.76 | 19.37 | 24.74 | 136.50 |
| Example 3 | 9.61 | 22.46 | 22.10 | 187.30 |
| Comparative Example 3-1 | 7.30 | 8.91 | 10.87 | 178.80 |

TABLE 1-continued

Magnetic Properties and Resistivity Data of the Magnets Prepared in the Examples and the Comparative Examples

| Item | Br (kG) | Hcj (kOe) | (BH)max (MGOe) | Resistivity (μΩ · mm) |
|---|---|---|---|---|
| Comparative Example 3-2 | 8.91 | 17.65 | 17.88 | 156.40 |

It can be seen from Table 1 that the magnetic properties of the magnets in examples 1-3 are all better than those in the comparative examples, indicating that adding fluoride in the preparation method of the present invention can effectively improve the resistivity of the magnets and maintain the high magnetic properties of the magnets at the same time. In comparative examples 1-2, 2-2 and 3-2, the fluoride is simply mixed with the magnetic powder, the resistivity of the magnet can be improved, but the magnetic properties deteriorate rapidly. The properties of the magnets in comparative examples 1-3, 2-3 and 3-3 show that when no voltage is applied, the effect on improving the resistivity of the magnets is poor, and the magnetic properties are also affected to a certain extent.

Those skilled in the art should understand that the technical features of those embodiments can be combined freely, and not all the technical features of all possible combinations in those embodiments are described to make the description concise. However, all the combinations of these technical features should be deemed as the scope recorded in the specification as long as there is no contradiction therein.

The above-mentioned embodiments only express several implementation modes of this application, and are specifically described in details, but it cannot be understood as a limitation to the scope of the present invention. It should be noted that for those of ordinary skill in the art, a number of improvements and modifications can be made without departing from the principle of the present invention. Such improvements and modifications should also fall within the protection scope of the present invention.

The invention claimed is:

1. A method for preparing a sintered samarium-cobalt magnet, comprising the following steps:

(1) weighing fluoride, mixing the fluoride with alcohol and a surfactant, and then performing ball milling to obtain fine fluoride powder, with an average particle size of 10-200nm;

(2) rinsing and drying the fine fluoride powder prepared in step (1) in an oxygen-free glove box to obtain fluoride powder;

(3) weighing metal raw materials according to compositions of $Sm_2(CoFeCuZr)_{17}$ alloy, and then smelting the raw materials uniformly to obtain alloy ingots;

(4) crushing the alloy ingots, and obtaining magnetic powder by powder processing, with an average particle size of 2.5-5.2 μm;

(5) mixing the fluoride powder prepared in step (2) with alcohol, and preparing a suspension by ultrasonic treatment;

(6) spreading the magnetic powder prepared in step (4) evenly on a platinum sheet A at a bottom of a container, and pouring the suspension prepared in step (5) into the container; after pouring, placing a platinum sheet B on a surface of the liquid in a suspended manner, completely immersing the platinum sheet B in the suspension, then performing deposition treatment under an electric field, and applying a voltage to the platinum sheets A and B, with the platinum sheet B serving as a positive electrode and the platinum sheet A serving as a negative electrode, to obtain deposited magnetic powder;

(7) performing magnetic field orientation molding and cold isostatic pressing on the deposited powder prepared in step (6) to obtain compacts; and (8) sintering, solution-treating and annealing the compacts prepared in step (7) to obtain a sintered samarium-cobalt magnet.

2. The method for preparing a sintered samarium-cobalt magnet of claim 1, wherein the fluoride in step (1) is one or more of calcium fluoride, magnesium fluoride, terbium fluoride, samarium fluoride, copper fluoride, zirconium fluoride, cobalt fluoride and iron fluoride, and the fluoride is 1-3% (by weight) of the magnetic powder in step (4).

3. The method for preparing a sintered samarium-cobalt magnet of claim 1, wherein the surfactant in step (1) is one or more of oleic acid, n-heptane, ethylene glycol, cyclohexane, acetic acid and aminocyclic acid.

4. The method for preparing a sintered samarium-cobalt magnet of claim 1, wherein in step (1), an addition amount of the surfactant is 2%-6% (by weight) of the fluoride.

5. The method for preparing a sintered samarium-cobalt magnet of claim 1, wherein in step (1), a ball-to-material ratio of the ball milling process is 10-25 based on a percentage by weight.

6. The method for preparing a sintered samarium-cobalt magnet of claim 1, wherein the $Sm_2(CoFeCuZr)_{17}$ alloy in step (3) includes the following compositions based on a percentage by weight: $24 \leq Sm \leq 31$, $5 \leq Fe \leq 30$, $4 \leq Cu \leq 9$, $2 \leq Zr \leq 4$, and the remaining amount of Co.

7. The method for preparing a sintered samarium-cobalt magnet of claim 1, wherein the ultrasonic treatment time in step (5) is 0.5-4 h.

8. The method for preparing a sintered samarium-cobalt magnet of claim 1, wherein the voltage in step (6) is 3-10 V, and the time is 10-60 min.

9. The method for preparing a sintered samarium-cobalt magnet of claim 1, wherein in step (7), the magnetic field orientation forming process is performed at a magnetic field strength of 2T and a pressure of 30-100 MPa.

* * * * *